(12) United States Patent
Russ et al.

(10) Patent No.: US 7,880,423 B2
(45) Date of Patent: Feb. 1, 2011

(54) METHOD AND APPARATUS FOR STEPPER MOTOR STALL DETECTION

(75) Inventors: Ronald Paul Russ, Farmington Hills, MI (US); Jeff Turner, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 430 days.

(21) Appl. No.: 11/959,747

(22) Filed: Dec. 19, 2007

(65) Prior Publication Data

US 2009/0160390 A1 Jun. 25, 2009

(51) Int. Cl.
*H02P 8/00* (2006.01)

(52) U.S. Cl. ............... 318/696; 318/685; 318/671; 318/560

(58) Field of Classification Search ........... 318/696, 318/685, 671, 560
See application file for complete search history.

(56) References Cited

U.S. PATENT DOCUMENTS 4,658,194 A * 4/1987 Richter et al. ........... 318/696
6,111,380 A * 8/2000 Munz et al. ............. 318/474
6,861,817 B2   3/2005 Pigott et al.
6,900,657 B2 * 5/2005 Bui et al. ................ 324/772
7,145,309 B2 * 12/2006 Reiter et al. ............. 318/696
7,170,254 B2   1/2007 Yamada
7,224,140 B2 * 5/2007 Arefeen et al. ........... 318/685

FOREIGN PATENT DOCUMENTS

DE        4217265 A1     12/1993

* cited by examiner

*Primary Examiner*—Walter Benson
*Assistant Examiner*—David S Luo
(74) *Attorney, Agent, or Firm*—Fraser Clemens Martin & Miller LLC; J. Douglas Miller

(57) ABSTRACT

A detector device and a method for detecting a stall condition in a stepper motor, wherein the characteristics of the back EMF are identified directly from a waveform of the back EMF, specifically a first peak of the back EMF, a valley of the back EMF, and a second peak of the rectified integral of the back EMF, to determine a condition of the stepper motor.

14 Claims, 4 Drawing Sheets

METHOD AND APPARATUS FOR STEPPER MOTOR STALL DETECTION

FIELD OF THE INVENTION

The present invention relates to a stepper motor. More particularly, the invention is directed to a detector device and a method for detecting a stall condition in a stepper motor.

BACKGROUND OF THE INVENTION

Stepper motors are currently being used in automotive instrument clusters to display items such as vehicle speed, engine RPM, fuel level, and engine temperature, for example. Stepper motors utilized in an open loop system require initialization strategies to find a reference, or zero, position. If the zero reference position is not found accurately at key events such as power on reset, running reset, or ignition on/off sequencing, then misleading or inaccurate information can be conveyed to the driver. Detection of the zero position enables accurate position calibration. Typically, the detection of the zero position involves the detection of a stepper motor condition such as a stall condition, for example.

Original strategies rotated the stepper motors towards a fixed zero position reference stop at a fixed velocity for a fixed duration of time to ensure that the pointer attached to the stepper motor started at a known repeatable position. This strategy results in an excessive amount of time required for the reset homing to occur and can also result in the pointer bouncing repeatedly on the stop.

Recent strategies have incorporated back electro-motive-force (EMF) detection to signal when the pointer has stalled against the stop. This involves repeatedly driving one coil of the stepper motor and monitoring the other coil for the induced voltage.

One current solution is to use the built-in hardware of a particular microcontroller that integrates and accumulates back EMF. This strategy uses a fixed time period and a threshold comparison to detect if the pointer has reached the stop. Manufacturing processes for this solution prevent the gain from the detection circuitry to be within acceptable ranges to provide a viable and robust detection algorithm.

It would be desirable to have a detector device and a method for detecting a stall condition in a stepper motor, wherein the characteristics of the back EMF are identified directly from the waveform and not derived and therefore subject to characteristics of the underlying hardware.

SUMMARY OF THE INVENTION

Concordant and consistent with the present invention, a detector device and a method for detecting a stall condition in stepper motor, wherein the characteristics of the back EMF are identified directly from the waveform and not derived and therefore subject to characteristics of the underlying hardware, has surprisingly been discovered.

In one embodiment, a detector device comprises an input adapted to receive a back EMF signal, a programmable function means, wherein the programmable function means controls: a detection of a first peak of the back EMF signal, wherein the first peak exceeds a predetermined first peak threshold, a detection of a valley of the back EMF signal, wherein a difference between the first peak and the valley exceeds a predetermined peak-to-valley delta, and a detection of a second peak of the back EMF signal, wherein the second peak exceeds a predetermined second peak threshold; and an output adapted to transmit an output signal based upon whether the first peak, the valley and the second peak have been detected.

The invention also provides methods for detecting a condition in a stepper motor.

One method comprises the steps of receiving an input signal from a stepper motor representing a condition of the stepper motor, detecting a first peak of the input signal, wherein the first peak exceeds a predetermined first peak threshold, detecting a valley of the input signal, wherein a difference between the first peak and the valley exceeds a predetermined peak-to-valley delta, detecting a second peak of the input signal, wherein the second peak exceeds a predetermined second peak threshold, and transmitting an output signal to an analyzer, wherein the output signal indicates the condition of the stepper motor based upon whether the first peak, the valley and the second peak have been detected.

Another method comprises the steps of providing a stepper motor including at least a first coil and a second coil and a magnetic rotor, the magnetic rotor having a plurality of magnetic poles, providing an electric current for alternately driving the first coil and the second coil, wherein a back EMF signal is induced in an undriven one of the coils by the driving of a driven one of the coils, rectifying the back EMF signal of the undriven coil, integrating the rectified back EMF signal, detecting a first peak of the back EMF signal, wherein the first peak exceeds a predetermined first peak threshold, detecting a valley of the back EMF signal, wherein a difference between the first peak and the valley exceeds a predetermined peak-to-valley delta, detecting a second peak of the back EMF signal, wherein the second peak exceeds a predetermined second peak threshold, and transmitting an output signal to an analyzer, wherein the output signal indicates a condition of a stepper motor based upon whether the first peak, the valley and the second peak have been detected.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
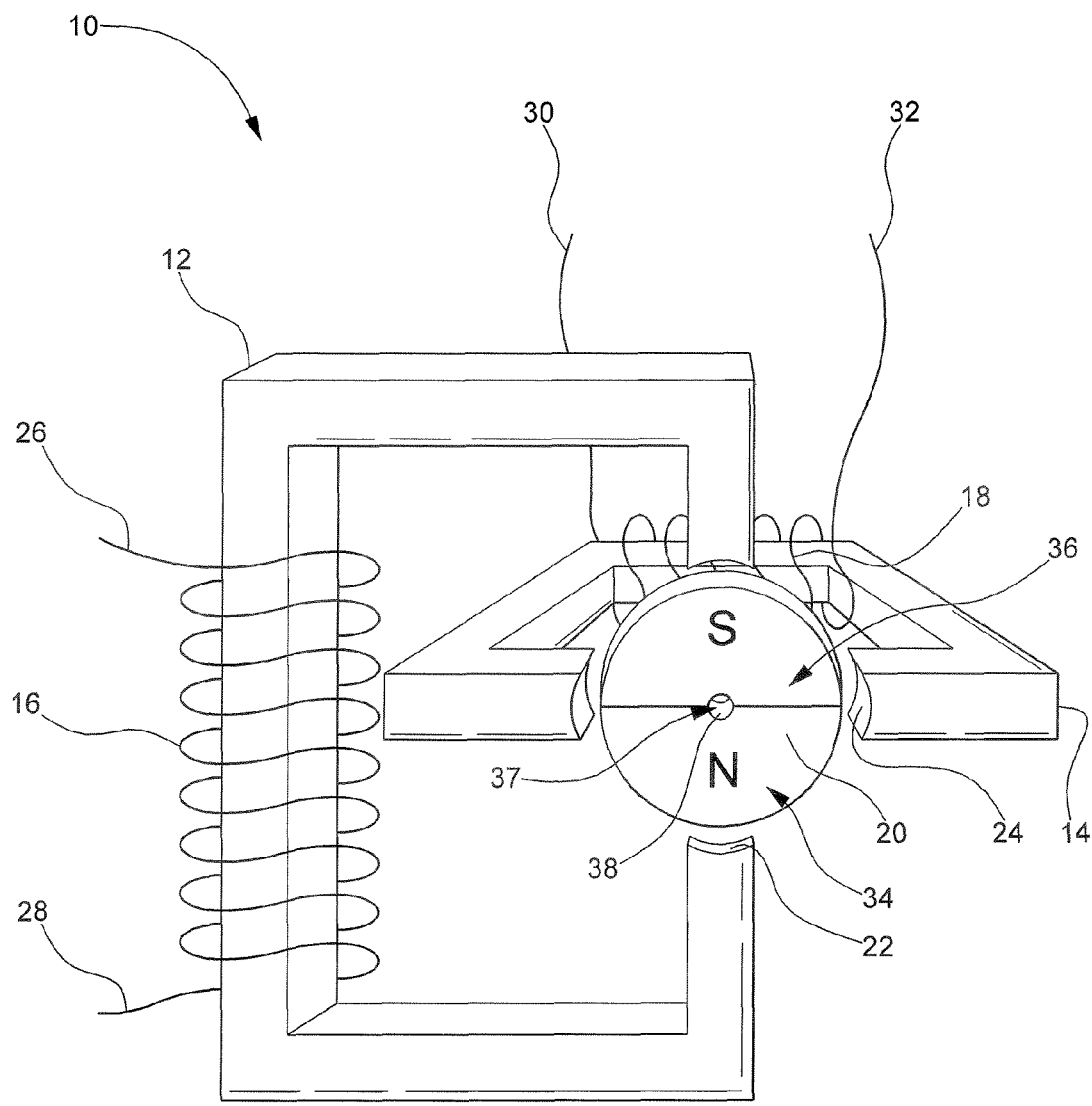
FIG. 1 is a front perspective view of a stepper motor known in the art.

FIG. 1 shows a stepper motor 10 according to the prior art. As shown, the stepper motor 10 includes a first conductive core 12, a second conductive core 14, first inductive coil 16, a second inductive coil 18, and a permanent magnet 20. It is understood that the stepper motor 10 may include any number of conductive cores and coil windings, as desired.

The first conductive core 12 may be formed from any conductive material such as metal, for example. The first conductive core 12 is disposed adjacent the permanent magnet 20, wherein the permanent magnet 20 is free to rotate. As shown, the first conductive core 12 includes a first conductive core aperture 22, the permanent magnet 20 disposed therein. Although the first conductive core 12 is shown having a rectangular shape, it is understood that the first conductive core 12 may have any shape and size, as desired.

The second conductive core 14 may be formed from any conductive material such as metal, for example. The second conductive core 14 is disposed adjacent the permanent magnet 20, wherein the permanent magnet 20 is free to rotate. As shown, the second conductive core 14 includes a second conductive core aperture 24, the permanent magnet 20 disposed therein. Although the second conductive core 14 is shown having a rectangular shape, it is understood that the second conductive core 14 may have any shape and size, as desired.

The first inductive coil 16 may be formed from any conductive material such as metal, for example. The first inductive coil 16 includes a first inductive coil first lead 26 and a first inductive coil second lead 28. Each lead 26, 28 is adapted for electrical communication with a source of electrical energy (not shown). The first inductive coil 16 is wound around at least a portion of the first conductive core 12. It is understood that the first inductive coil 16 may have any number of turns or windings.

The second inductive coil 18 may be formed from any conductive material such as metal, for example. The second inductive coil 18 includes a second inductive coil first lead 30 and a second inductive coil second lead 32. Each lead 30, 32 is adapted for electrical communication with a source of electrical energy. The second inductive coil 18 is wound around at least a portion of the second conductive core 14. It is understood that the second inductive coil 18 may have any number of turns or windings.

The permanent magnet 20, also referred to as a magnetic rotor, is shown as a magnetic disk having a first magnetic pole 34 and a second magnetic pole 36. It is understood that the permanent magnet 20 may have any shape, as desired. It is further understood that the permanent magnet 20 may have any number or orientation of magnet poles, as desired. The permanent magnet 20 is disposed adjacent the first conductive core 12 and the second conductive core 14. The permanent magnetic 20 further includes a rotor shaft 38 having an axis 37, the rotor shaft adapted to control the rotational motion of a secondary device (not shown) such as an instrument pointer, for example.

Figure 2:
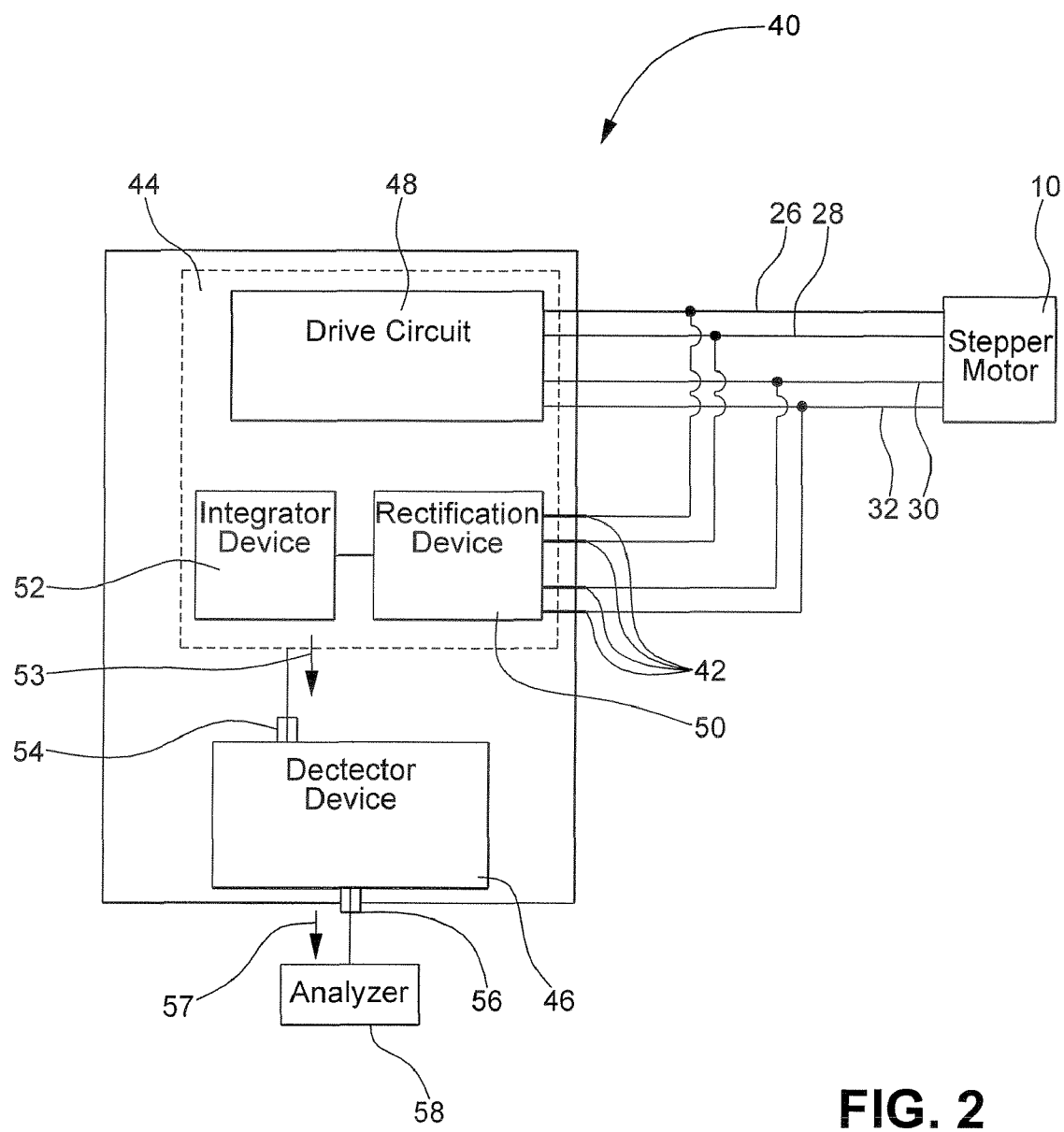
FIG. 2 is a schematic diagram of a programmable control system in electrical communication with a stepper motor according to an embodiment of the present invention.
Figure 3A:
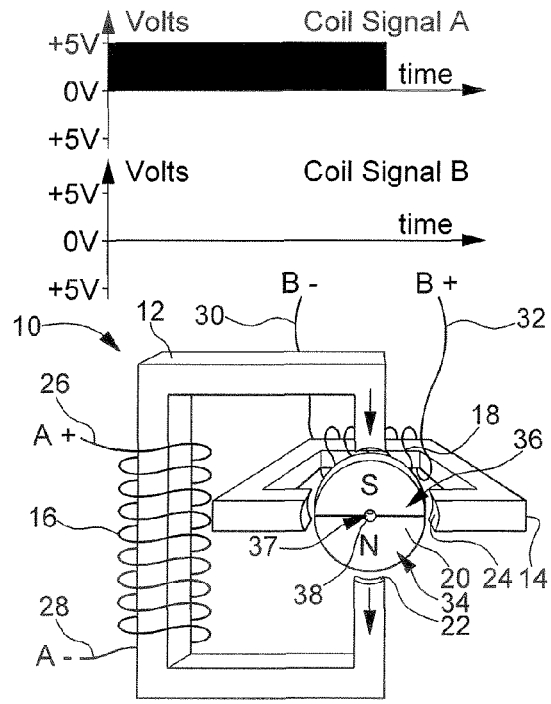
FIGS. 3a, 3b, 3c, and 3d are sequential diagrams illustrating operation of the stepper motor in FIG. 1.
Figure 3B:
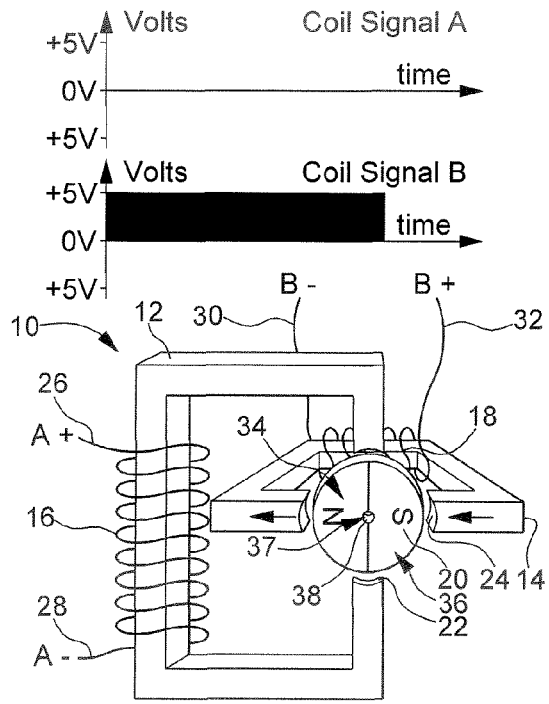
Figure 3C:
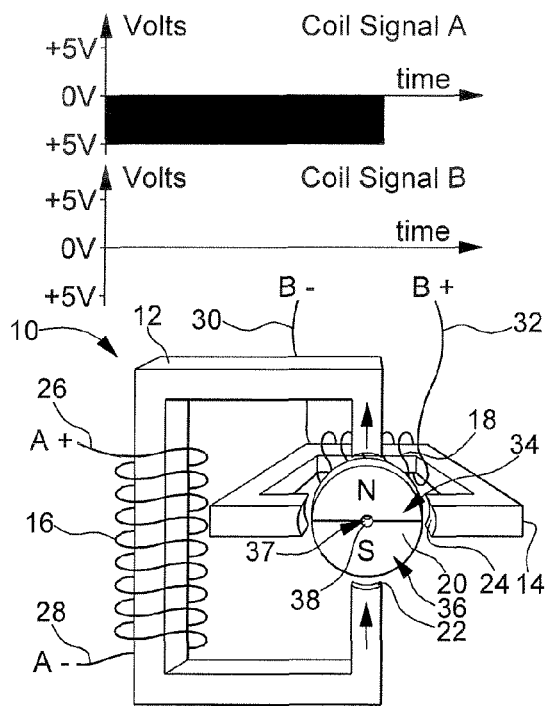
Figure 3D:
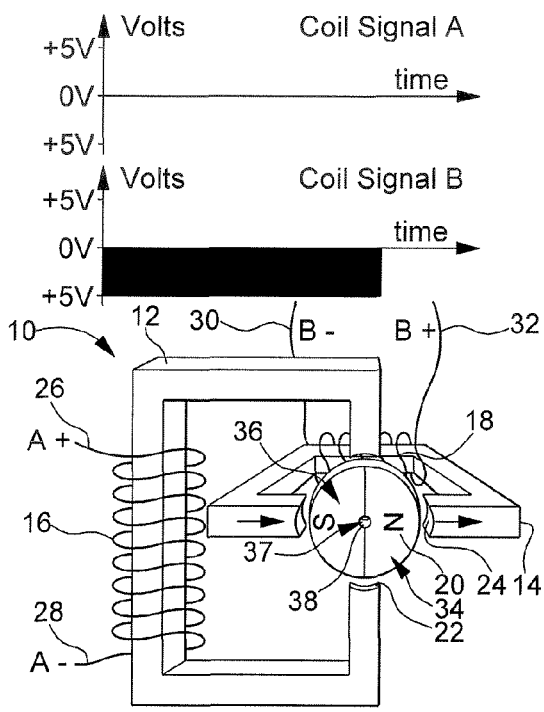

FIG. 2 shows a programmable control system 40 in electrical communication with a stepper motor 10 according to an embodiment of the present invention. The programmable control system 40 includes a plurality of programmable control system inputs 42, a control unit 44, and a detector device 46.

The plurality of programmable control system inputs 42 is adapted to receive an electrical signal such as a sinusoidal and triangular voltage waveform, for example. As shown, the programmable control system inputs 42 are in electrical communication with the stepper motor 10. Although the programmable control system 40 is shown having four programmable control system inputs 42, it is understood that the programmable control system 40 may have any number of programmable control system inputs 42, as desired.

The control unit 44 includes a drive circuit 48, a rectification device 50, and an integrator device 52. The drive circuit 48 is in electrical communication with the plurality of electrical leads 26, 28, 30, 32 of the stepper motor 10. The drive circuit 48 is adapted to provide an electric current to the stepper motor 10. It is understood that the drive circuit 48 may provide electrical communication between the electrical leads 26, 28, 30, 32 of the stepper motor 10 and the source of electrical energy. The rectification device 50 is in electrical communication with the programmable control system inputs 42. The rectification system 50 may be any conventional system for rectifying an electric signal and providing an output signal having a single polarity such as multiplexer circuitry, for example. The integrator device 52 is in electrical communication with the rectification device 50 and the detector device 46. It is understood that the integrator device 52 may be any conventional device, wherein an output signal 53 of the integrator device 52 is proportional to the integral of an input signal of the integrator device 52 such as an operation amplifier integrator, for example.

The detector device 46 includes a detector input 54 and a detector output 56. It is understood that the detector device 46 may be any conventional device for receiving an electrical signal, measuring the electrical signal, and transmitting an output relating to the signal measurement such as a microcomputer, for example. The detector device 46 may further include a programmable function, wherein the function provides control of the electrical signal measurement. The detector input 54 is in electrical communication with the integrator device 52 of the control unit 44. The detector output 56 is in electrical communication with an analyzer 58. The detector output 56 is adapted to transmit an output signal 57 of the detector device 46 to the analyzer 58. It is understood that the analyzer 58 may be any means for electrical signal analysis such as a microcomputer, for example. It is further understood that the output signal 57 of the detector device 46 may be transmitted to a display device (not shown), wherein a user may analyze and interpret the output signal 57.

In operation, the drive circuit 48 provides an effective voltage across the first inductive coil 16, wherein the voltage causes an electric current to flow through the first inductive coil 16. As the change in electric current occurs, a magnetic field is induced within the first inductive coil 16. The magnetic field is channeled through the first conductive core 12 toward the permanent magnet 20. When the magnetic field from the first inductive core 16 and the magnetic field from the permanent magnet 20 are not aligned, the permanent magnet 20 will rotate about the axis 37 of the rotor shaft 38. Because opposite magnetic fields attract and like fields repel each other, this rotation continues until the magnetic fields of the permanent magnet 20 have aligned with the opposite pair of magnetic fields from the first inductive coil 16. After the permanent magnet 20 has rotated into the new position, it settles and stops moving. It is understood that to keep the permanent magnet 20 rotating, the magnetic field from both the first inductive coil 16 and the second inductive coil 18 must be changed periodically in a sequence with alternating magnetic fields that keep the permanent magnet 20 in an unstable state and rotating in a desired direction.

FIGS. 3a, 3b, 3c, and 3d show a periodic alteration of the effective voltage across the first inductive coil 16 and the second inductive coil 18, wherein the alteration of the effective voltage induces an alternating magnetic field in the first conductive core 12 and the second conductive core 14. The alternating magnetic fields cause the permanent magnet 20 to rotate about the axis 37 of the rotor shaft 38. The rotation of the permanent magnet 20 causes a change in the magnetic flux through the conductive core 12, 14 of the undriven inductive coil. The undriven inductive coil opposes the change in magnetic field, thereby inducing a current in the undriven coil. The change in the undriven inductive coil current induces a voltage that can be measured across its inductive coil leads 26, 28, 32, 32. This induced voltage is referred to as the back electro-motive-force (EMF).

The back EMF signal is transmitted to the rectification device 50. The back EMF signal is rectified and transmitted to the integrator device 52. The integral of the rectified back EMF signal, with respect to time, is transmitted as the integrator device output signal 53.

Figure 4:
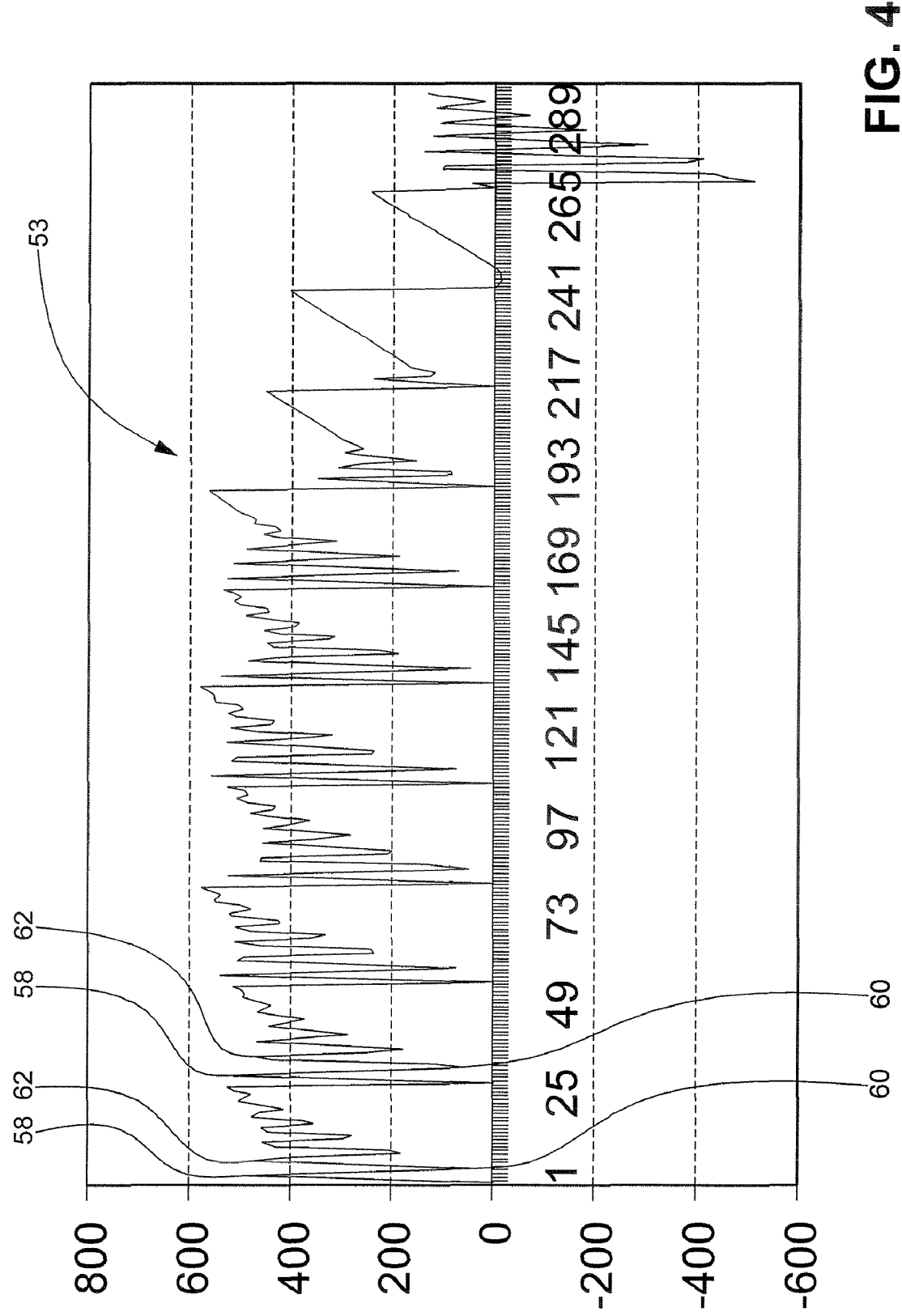
FIG. 4 is a plot of an integral of a back EMF signal according to an embodiment of the present invention.

FIG. 4 shows the output signal 53 of the integrator device 52 according to an embodiment of the present invention. The output signal 53 of the integrator device 52 is transmitted to the detector device 46, wherein the detector device 46 measures the output signal 53. Specifically, the detector device 46 is pre-programmed to measure the output signal 53 waveform.

The detector device 46 detects a first peak 58 of the integrator device output signal 53, wherein the first peak 58 exceeds a pre-determined first peak threshold. When the first peak 58 exceeds the first peak threshold, the detector device 46 transmits a first peak data to the detector device output 56 for analysis. The detector device 46 then detects a valley 60 of the integrator device output signal 53, wherein a difference between the first peak 58 value and the valley 60 value exceeds a pre-determined peak-to-valley delta. When a valley 60 is detected, the detector device 46 transmits a valley data to the detector output 56. The detector device 46 then detects a second peak 62 of the integrator device output signal 53, wherein the second peak 62 exceeds a pre-determined second peak threshold. When the second peak 62 exceeds the second peak threshold, the detector device 46 transmits a second peak data to the detector device output 56. For example the first peak threshold is 250 mV; the peak-to-valley delta is 100 mV; and the second peak threshold is 350 mV. However, it is understood that other values for the first peak threshold, peak-to-valley delta, and second peak threshold can be used as desired. The detection of the first peak 58, the valley 60, and the second peak 62 is continued for each step of the stepper motor 10 rotation. The detector device output 56 transmits a signal output 57 to the analyzer 58. Where the detector device 46 is able to detect the first peak 58, a valley 60, and a second peak 62, according to the first peak threshold, the second peak threshold, and the peak-to-valley delta, the permanent magnet 20 is assumed to be in motion. Where the detector device 46 is unable to detect a first peak 58, a valley 60, and a second peak 62 over a pre-determined time, the permanent magnet 20 is assumed to be stalled. It is understood that the programmed measurement of the output signal 53 and the signal analysis may be repeated, as desired.

The device detector 46 and method according to the present invention provide an efficient means for detection of a condition of the stepper motor 10. The characteristics of the back EMF of the stepper motor 10 are identified directly from the back EMF waveform and are not derived from and subject to characteristics of the underlying hardware. The direct analysis provides for an increased flexibility in programmable analysis of the back EMF of a stepper motor 10 for detecting a condition of the stepper motor 10.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for detecting a condition of a stepper motor, the method comprising the steps of:
   receiving an input signal from a stepper motor representing a condition of the stepper motor, wherein the input signal is a rectified integral of a back EMF signal of the stepper motor;
   detecting a first peak of the input signal, wherein the first peak exceeds a predetermined first peak threshold;
   detecting a valley of the input signal, wherein a difference between the first peak and the valley exceeds a predetermined peak-to-valley delta;
   detecting a second peak of the input signal, wherein the second peak exceeds a predetermined second peak threshold; and
   transmitting an output signal to an analyzer, wherein the output signal indicates the condition of the stepper motor based upon whether the first peak, the valley and the second peak have been detected.

2. The method according claim 1, further comprising the step of providing the stepper motor including at least a first coil, a second coil and a magnetic rotor, the magnetic rotor having a plurality of magnetic poles.

3. The method according to claim 2, further comprising the step of providing an electric current for alternatingly driving the first coil and the second coil, wherein a back EMF signal is induced in an undriven one of the coils by the driving of a driven one of the coils.

4. The method according to claim 1, wherein a failure to detect the first peak, the valley, and the second peak according to the first peak threshold, the peak-to-valley delta, and the second peak threshold, indicates a stalled condition of the stepper motor.

5. The method according to claim 1, wherein the output signal represents the first peak, the valley, and the second peak according to the first peak threshold, the peak-to-valley delta, and the second peak threshold, the output signal indicating a moving condition of the stepper motor.

6. A method for detecting a condition of a stepper motor, the method comprising the steps of:
   providing a stepper motor including at least a first coil and a second coil and a magnetic rotor, the magnetic rotor having a plurality of magnetic poles;
   providing an electric current for alternately driving the first coil and the second coil, wherein a back EMF signal is induced in an undriven one of the coils by the driving of a driven one of the coils;
   rectifying the back EMF signal of the undriven coil to generate a rectified back EMF signal;
   integrating the rectified back EMF signal to generate a rectified integral of the back EMF signal;
   detecting a first peak of the rectified integral of the back EMF signal, wherein the first peak exceeds a predetermined first peak threshold;
   detecting a valley of the rectified integral of the back EMF signal, wherein a difference between the first peak and the valley exceeds a predetermined peak-to-valley delta;
   detecting a second peak of the rectified integral of the back EMF signal, wherein the second peak exceeds a predetermined second peak threshold; and
   transmitting an output signal to an analyzer, wherein the output signal indicates a condition of a stepper motor based upon whether the first peak, the valley and the second peak have been detected.

7. The method according to claim 6, wherein a failure to detect the first peak, the valley, and the second peak according to the first peak threshold, the peak-to-valley delta, and the second peak threshold, indicates a stall condition of the stepper motor.

8. The method according to claim 6, wherein the output signal represents the first peak, the valley, and the second peak according to the first peak threshold, the peak-to-valley delta, and the second peak threshold, the output signal indicating a moving condition of the stepper motor.

9. The method according to claim 6, wherein the back EMF signal is integrated by an operational amplifier integrator.

10. A detector device comprising:
an input adapted to receive a rectified integral of a back EMF signal;
a programmable function means, wherein the programmable function means controls:
  a detection of a first peak of the rectified integral of the back EMF signal, wherein the first peak exceeds a predetermined first peak threshold,
  a detection of a valley of the rectified integral of the back EMF signal, wherein a difference between the first peak and the valley exceeds a predetermined peak-to-valley delta, and
  a detection of a second peak of the rectified integral of the back EMF signal, wherein the second peak exceeds a predetermined second peak threshold; and
an output adapted to transmit an output signal based upon whether the first peak, the valley and the second peak have been detected.

11. The detector device according to claim 10, wherein the back EMF signal is induced by the rotation of a stepper motor.

12. The detector device according to claim 11, wherein a failure to detect the first peak, the valley, and the second peak according to the first peak threshold, the peak-to-valley delta, and the second peak threshold, indicates a stall condition of the stepper motor.

13. The detector device according to claim 11, wherein the output signal represents the first peak, the valley, and the second peak according to the first peak threshold, the peak-to-valley delta, and the second peak threshold, the output signal indicating a moving condition of the stepper motor.

14. The detector device according to claim 10, further comprising a means for analyzing the output signal in electrical communication with the output of the detector device.

* * * * *